United States Patent
Ding et al.

(10) Patent No.: US 10,229,505 B2
(45) Date of Patent: Mar. 12, 2019

(54) MOTION DETERMINATION SYSTEM AND METHOD THEREOF

(71) Applicant: Xiaoyi Technology Co., Ltd., Shanghai (CN)

(72) Inventors: Dajun Ding, Shanghai (CN); Lili Zhao, Shanghai (CN); Taiqiang Cao, Shanghai (CN)

(73) Assignee: SHANGHAI XIAOYI TECHNOLOGY CO., LTD., Shanghai (CN)

( * ) Notice: Subject to any disclaimer, the term of this patent is extended or adjusted under 35 U.S.C. 154(b) by 81 days.

(21) Appl. No.: 15/205,396

(22) Filed: Jul. 8, 2016

(65) Prior Publication Data

US 2018/0005384 A1    Jan. 4, 2018

(30) Foreign Application Priority Data

Jun. 29, 2016  (CN) .......................... 2016 1 0496592

(51) Int. Cl.
| | |
|---|---|
| *G06K 9/00* | (2006.01) |
| *G06T 7/246* | (2017.01) |
| *G06T 7/215* | (2017.01) |
| *G06T 7/20* | (2017.01) |

(52) U.S. Cl.
CPC .......... *G06T 7/246* (2017.01); *G06K 9/00791* (2013.01); *G06T 7/20* (2013.01); *G06T 7/215* (2017.01); *G06T 2207/30252* (2013.01)

(58) Field of Classification Search
None
See application file for complete search history.

(56) References Cited

U.S. PATENT DOCUMENTS

| | | | | |
|---|---|---|---|---|
| 5,973,732 | A * | 10/1999 | Guthrie .............. | G06K 9/00778 348/150 |
| 6,915,228 | B2 * | 7/2005 | Uffenkamp ............ | G01D 18/00 348/47 |
| 7,365,831 | B2 * | 4/2008 | Braeunl ............. | G06K 9/00812 356/4.01 |
| 8,744,680 | B2 * | 6/2014 | Rieger .................. | B60W 40/11 235/385 |

(Continued)

FOREIGN PATENT DOCUMENTS

| | | |
|---|---|---|
| CN | 102791557 A | 11/2012 |
| CN | 103303205 A | 9/2013 |

*Primary Examiner* — Nancy Bitar
(74) *Attorney, Agent, or Firm* — Finnegan, Henderson, Farabow, Garrett & Dunner, LLP (57) ABSTRACT

Methods and apparatus for determining the motion of a movable object are disclosed. The methods may include, in a view of the environment outside the movable object, identifying a first region of interest (ROI) corresponding to a static portion of the environment. The methods may also include, in the view of the environment, identifying a second region of interest (ROI) corresponding to an active portion of the environment. The methods may also include receiving first and second image data respectively representing the first and second ROIs. The methods may also include analyzing the first image data over time. The methods may also include analyzing the second image data over time. The methods may further include determining whether the movable object is in motion based on the analyzes of the first and second image data.

23 Claims, 7 Drawing Sheets

(56) References Cited

U.S. PATENT DOCUMENTS

| | | | |
|---|---|---|---|
| 9,791,551 B1* | 10/2017 | Eshraghi | G01S 7/354 |
| 9,928,444 B2* | 3/2018 | Lee | G06K 9/6262 |
| 2012/0323444 A1* | 12/2012 | Rieger | B60W 40/11 |
| | | | 701/37 |
| 2013/0235201 A1* | 9/2013 | Kiyohara | G06K 9/00805 |
| | | | 348/148 |
| 2015/0294183 A1* | 10/2015 | Watanabe | G06K 9/00771 |
| | | | 382/203 |

* cited by examiner

|   | 1 | 3 | 5 | 7 |
|---|---|---|---|---|
|   |   |   |   |   |
|   | 17 | 19 | 21 | 23 |
|   |   |   |   |   |

Original Image

Fig. 4A

| 1 | 3 | 5 | 7 |
|---|---|---|---|
| 17 | 19 | 21 | 23 |

Sampling Result

Fig. 4B

| (1, 3, 17, 19) | (5, 7, 21, 23) |
|---|---|

Averaging Result

MOTION DETERMINATION SYSTEM AND METHOD THEREOF

CROSS-REFERENCE TO RELATED APPLICATION

This application is based upon and claims priority from Chinese Patent Application No. 201610496592.X, filed on Jun. 29, 2016, the disclosure of which is expressly incorporated herein by reference in its entirety.

TECHNICAL FIELD

The present disclosure generally relates to computer vision technology, and more specifically to a systems and method for determining the motion of a movable object.

BACKGROUND

Advanced Driver Assistance Systems (ADAS) increase vehicle safety and road safety, and pave the way for realizing the autonomous vehicles. An ADAS avoids collisions and accidents by using technologies that alert drivers of potential dangers, or by implementing safeguards and taking over control of the vehicles. To function properly and provide good user experience, an ADAS needs to accurately understand a vehicle's real-time operation status, such as whether or not the vehicle is moving. For example, many features of an ADAS, including collision warning/avoidance and lane departure warning, only work well after the vehicle enters a normal driving mode. When the vehicle stops or moves at a low speed (e.g., when the driver attempts to park the vehicle in a crowded space), these ADAS features may need to be turned off. Therefore, it is desirable to determine the vehicle's motion information in real time and automatically turn on/off the ADAS based on the motion information.

Conventionally, an ADAS may include a Global Positioning System (GPS) module for connecting to an external GPS receiver. The GPS receiver feeds the vehicle's motion information, such as the vehicle speed, to the ADAS. However, the GPS receiver may have poor reception in a covered space (e.g., a tunnel) or in a city street surrounded by tall buildings. Also, the GPS information may not be accurate when the vehicle stops or is at a low speed. Moreover, for a portable GPS receiver, the driver may have to frequently connect/disconnect the GPS receiver to/from the ADAS. For example, to prevent theft, the driver needs to disconnect the GPS receiver from the ADAS after each driving session, and reconnect the GPS receiver when starting the next session. This is cumbersome for the driver.

The disclosed methods and systems address one or more of the problems listed above.

SUMMARY

Consistent with one embodiment of the present disclosure, a method for determining movement of a movable object is provided. The method may include, in a view of the environment outside the movable object, identifying a first region of interest (ROI) corresponding to a static portion of the environment. The method may also include, in the view of the environment, identifying a second region of interest (ROI) corresponding to an active portion of the environment. The method may also include receiving first and second image data respectively representing the first and second ROIs. The method may also include analyzing the first image data over time. The method may also include analyzing the second image data over time. The method may further include determining whether the movable object is in motion based on the analyses of the first and second image data.

Consistent with another embodiment of the present disclosure, a device for determining movement of a movable object is provided. The device may include a memory storing instructions. The device may also include a processor configured to execute the instructions to, in a view of the environment outside the movable object, identify a first region of interest (ROI) corresponding to a static portion of the environment; in the view of the environment, identify a second region of interest (ROI) corresponding to an active portion of the environment; receive first and second image data respectively representing the first and second ROIs; analyze the first image data over time; analyze the second image data over time; and determine whether the movable object is in motion based on the analyses of the first and second image data.

Consistent with yet another embodiment of the present disclosure, a non-transitory computer-readable storage medium storing instructions for determining movement of a movable object is provided. The instructions cause a processor to perform operations including, in a view of the environment outside the movable object, identifying a first region of interest (ROI) corresponding to a static portion of the environment; in the view of the environment, identifying a second region of interest (ROI) corresponding to an active portion of the environment; receiving first and second image data respectively representing the first and second ROIs; analyzing the first image data over time; analyzing the second image data over time; and determining whether the movable object is in motion based on the analyses of the first and second image data.

It is to be understood that both the foregoing general description and the following detailed description are exemplary and explanatory only and are not restrictive of the invention, as claimed.

DESCRIPTION OF DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise noted. The implementations set forth in the following description of exemplary embodiments do not represent all implementations consistent with the invention. Instead, they are merely examples of devices and methods consistent with aspects related to the invention as recited in the appended claims.

Figure 1:
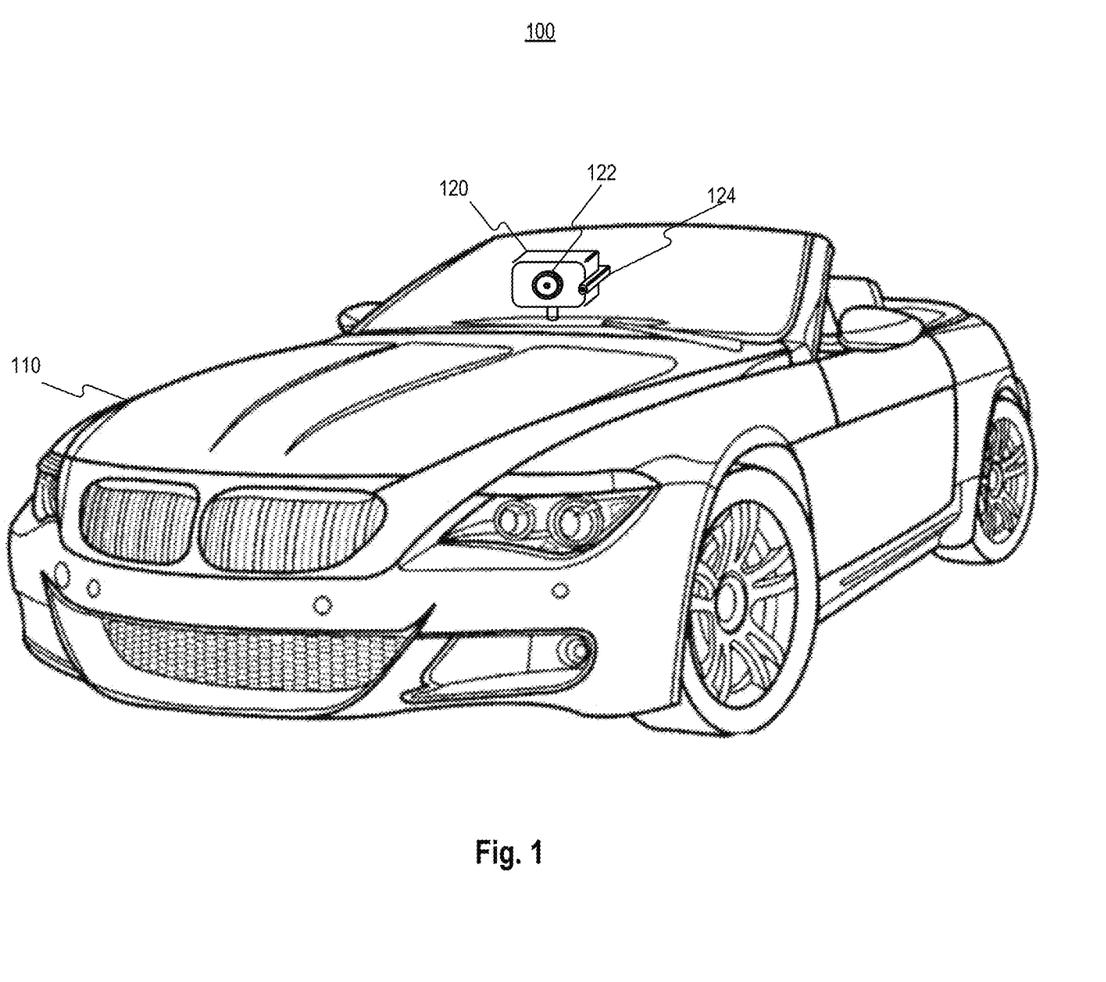
FIG. 1 schematic diagram illustrating an implementation environment for determining the motion of a movable object, according to an exemplary embodiment.

FIG. 1 is a schematic diagram illustrating an implementation environment 100 for determining the motion of a movable object, according to an exemplary embodiment. Referring to FIG. 1, implementation environment 100 may include a movable object 110 and a smart driver assistance device 120.

Movable object 110 may be any object, machine, device, or system that can move and stop. Movable object 110 may have its own power source. Alternatively, movable object 110 may have no power and must be moved by another object. Movable object 110 may move on or within any suitable medium, such as land, air, water, rails, space, underground, etc. For illustrative purpose only, movable object 110 is shown and described herein as a wheeled vehicle traveling on land. However, it is understood that the disclosed embodiments can be applied to any other types of movable objects, such as trains, marine vessels, airplanes, etc. For the convenience of the description, in the following description movable object 110 will be referred to as vehicle 110.

Smart driver assistance device 120 may be a device affixed to the dashboard of vehicle 110 and configured to monitor the operation status of vehicle 110. Smart driver assistance device 120 may include a dashboard camera 122 for capturing the outside environment surrounding vehicle 110, such as road condition, ground traffic, etc. Dashboard camera 122 may incorporate various features suitable for dashboard recording. In one example, dashboard camera 122 may use a 3MP (megapixel) light sensor, which is operable in conditions including low-light conditions such as at nighttime, in tunnels, or in underground parking lots. Dashboard camera 122 may also use an F1.8 aperture lens that is suitable for low-light recording. Dashboard camera 122 may also have a wide field of view, such as a 165° viewing angle. Dashboard camera 122 may further be configured to record videos with various resolutions and frame rates, such as 1296$p$ at 30 fps, and 1080p at 30 fps or 60 fps. The images captured by dashboard camera 122 may be stored in a memory or storage device for further processing.

Smart driver assistance device 120 may also include one or more embedded ADAS modules (not shown) configured to provide various types of driver assistance. For example, an ADAS module may extract distance information from the images generated by dashboard camera 122 and issue forward collision warnings. That is, when vehicle 110 moves too close to a car in front of vehicle 110, the ADAS module may alert the driver and/or automatically apply the brakes. In another example, the ADAS module may provide lane departure warnings based on the images.

Computer vision technology may be used to understand and analyze the images generated by dashboard camera 122, in order to provide various ADAS functions. Computer vision may also be used to analyze the images to determine the movement information of vehicle 110. Based on the movement information, smart driver assistance device 120 may decide whether to turn on or off certain ADAS functions.

The frame difference method and the optical flow method are two computer vision methods that can determine the movement information of vehicle 110. The frame difference method computes the difference between a current image frame and a previous image frame (or an average of multiple previous image frames), and determines the motions of the objects in the image. The optical flow method computes the image optical flow field, i.e., the distribution of the apparent velocities of objects in an image, to determine the true velocities of the objects in the image. In both methods, after the motions of the objects in the environment surrounding vehicle 110 are determined, the motion of vehicle 110 may be determined based on the relative motion.

However, both the frame difference method and the optical method require large hardware capabilities, that is, require significant computing power. The frame difference method requires a large memory space to store the previous image frames, while the optical flow method needs to perform complex computations, usually through cluster computing. Thus, neither method may be easily applied in the embedded system environment of vehicle 110.

As described below, the disclosed embodiments provide a computer vision-based method for reliably determining the motion of a movable object in real time. The disclosed embodiments have a low hardware requirement and thus are suitable to be implemented in an embedded system of a vehicle. Specifically, the disclosed embodiments select multiple regions of interests (ROIs) from an image of an environment surrounding the movable object. The disclosed embodiments then reduce the image sizes of the ROIs while still maintaining the key features of the ROIs. Moreover, the disclosed embodiments implement a work flow to determine the motion of the movable object based on the features of the multiple ROIs.

Figure 2:
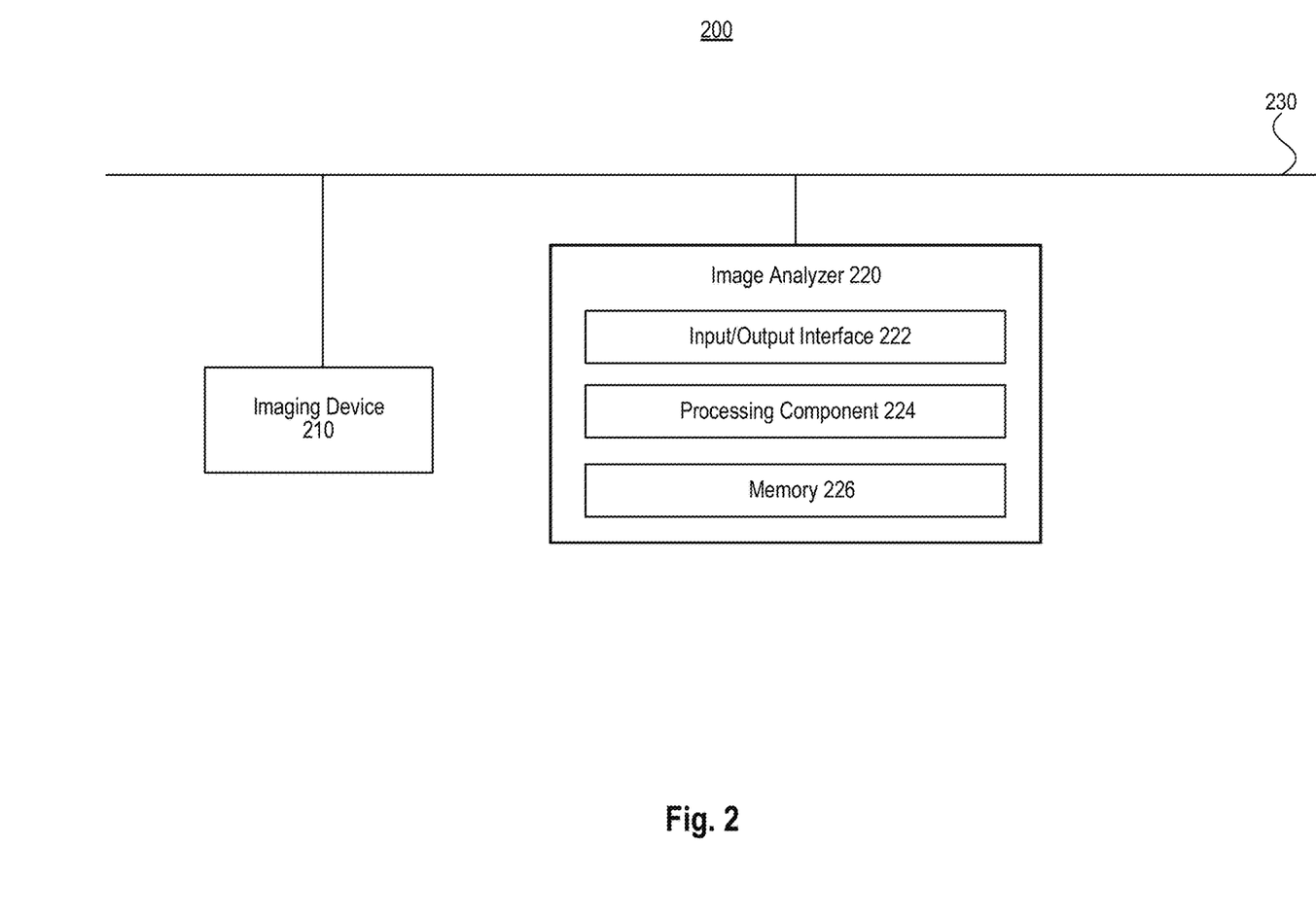
FIG. 2 is a block diagram of a motion detector for determining the motion of a movable object, according to an exemplary embodiment.

FIG. 2 is a block diagram of a motion detector 200 for implementing the disclosed motion determination method, according to an exemplary embodiment. For example, motion detector 200 may be used in vehicle 110. Referring to FIG. 2, motion detector 200 may include an imaging device 210 and an image analyzer 220. Imaging device 210 and image analyzer 220 may be connected to each other via a bus 230. While a bus architecture is shown in FIG. 2, any suitable architecture may be used, including any combination of wired and/or wireless networks. Additionally, such networks may be integrated into any local area network, wide area network, and/or the Internet.

Imaging device 210 may be configured to generate optical data of all or part of the environment surrounding vehicle 110. For example, imaging device 210 may be an optical device, such as a still camera or video camera. For example, imaging device 210 may be dashboard camera 122. In the following description, imaging device 210 is assumed to face along the forward direction of vehicle 110 and thus capture images of the environment and objects in front of vehicle 110. However, the present disclosure does not limit the imaging direction of imaging device 210. Moreover, multiple imaging devices 210 may be provided to capture the environment surrounding vehicle 110 from various angles.

Image analyzer 220 may be configured to use computer vision technology to determine the motion of vehicle 110 based on the images generated by imaging device 210. Image analyzer 220 may include an input/output (I/O) interface 222, a processing component 224, and a memory 226. I/O interface 222 may be configured for two-way communication between image analyzer 220 and various devices. For example, as depicted in FIG. 2, I/O interface 222 may receive image data generated by imaging device 210. After image analyzer 220 determines the motion of vehicle 110, I/O interface 222 may also send the determination result to other components of vehicle 110 for further processing.

I/O interface 222 may be configured to consolidate the image data that it receives from imaging device 210 and relay the imaging data to processing component 224. Processing component 224 may include any appropriate type of general-purpose processors, microprocessors, and controllers. Processing component 224 may also include special-purpose microprocessors, digital signal processors (DSPs), application specific integrated circuits (ASICs), digital signal processors (DSPs), digital signal processing devices (DSPDs), programmable logic devices (PLDs), or field programmable gate arrays (FPGAs). Processing component 224 may be configured as a separate processor module dedicated to perform the disclosed methods to determine the motion of vehicle 110. Alternatively, processing component 224 may be configured as a shared processor module for performing other functions of vehicle 100 unrelated to the motion determination purpose.

Memory 226 may be a non-transitory computer-readable storage medium including instructions executable by processing component 224 for performing the disclosed methods. Memory 226 may also store the image data received from imaging device 210, to support the operation of processing component 224. Memory 226 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

The above-described frame difference method determines the motion of vehicle 110 by determining the temporal change of the pixel values in the raw image data generated by imaging device 210. Because the large size of the raw image data, the computation may take a long time. Moreover, the determination result is sensitive to changes in ambient conditions. For example, a sudden change of brightness of a few pixels may significantly distort the determination result. To address these problems and to adapt to the limited hardware capacities in the embedded systems, the image size of the ROIs may be reduced before the frame difference method is performed on the ROIs.

Figure 3:
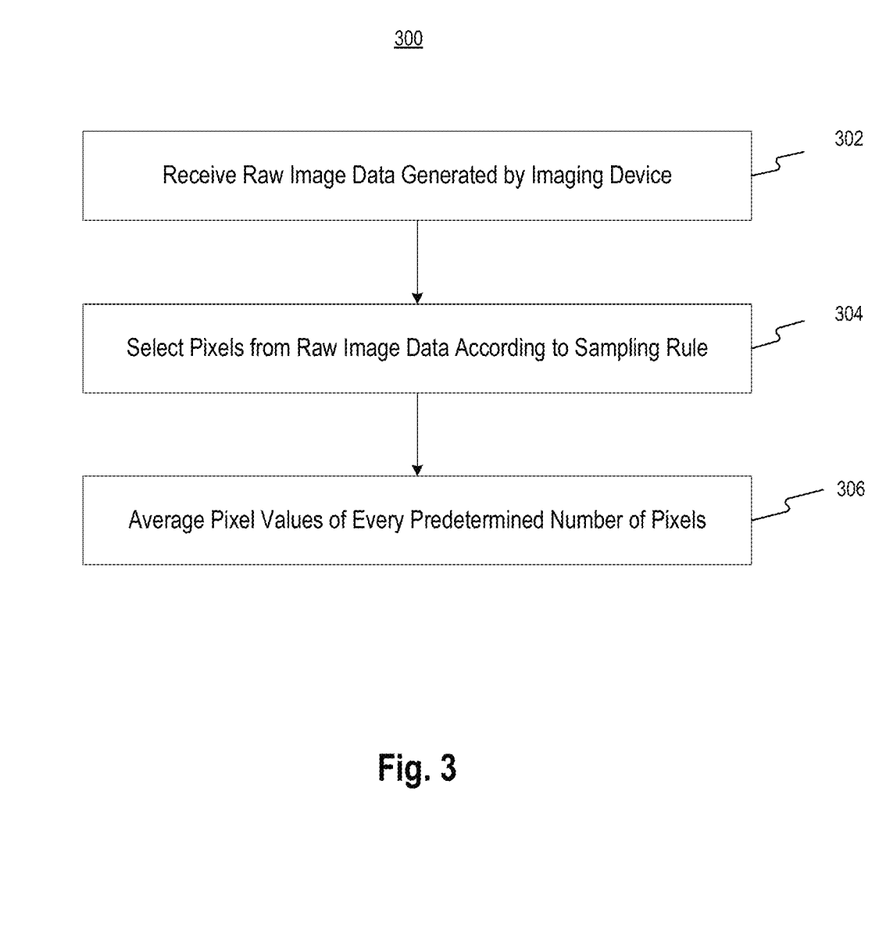
FIG. 3 is a flowchart of a method for reducing image size, according to an exemplary embodiment.

FIG. 3 is a flowchart of a method 300 for reducing image size, according to an exemplary embodiment. For example, method 300 may be implemented by image analyzer 220 (FIG. 2) to reduce the image sizes of one or more ROIs. Referring to FIG. 3, method 300 may include the following steps 302-306.

In step 302, image analyzer 220 receives raw image data generated by imaging device 210. The raw image data may be part or whole of an image frame. For example, the raw image data may represent one or more selected ROIs. The raw image data includes a plurality of pixels. Each pixel has one or more pixel values indicating certain attributes of the pixel, such as brightness and color of the pixel. For illustrative purpose only, the following description assumes the pixel value to be a greyscale value, with the lowest possible pixel value being 0 (black), and the maximum possible pixel value being 255 (white). The greyscale value indicates the brightness of the pixel.

In step 304, image analyzer 220 selects a set of pixels from the raw image data according to a sampling rule. For example, the sampling rule may be "selecting every other pixel in both the column and the row directions."

Figure 4A:
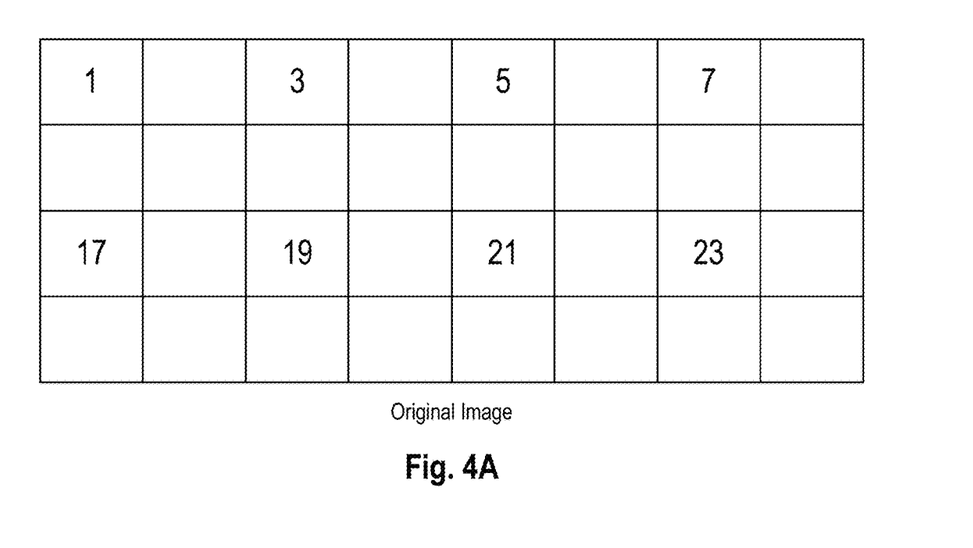
FIGS. 4A-4C are schematic diagrams illustrating an implementation of the method of FIG. 3, according to an exemplary embodiment.
Figure 4B:
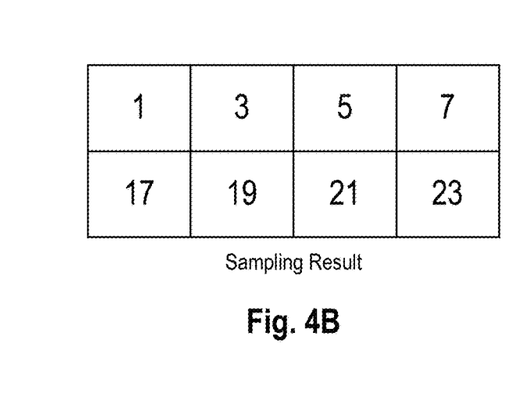
Figure 4C:
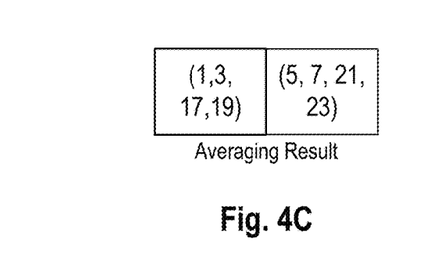

FIGS. 4A-4C are schematic diagrams illustrating an implementation of method 300, according to an exemplary embodiment. FIG. 4A shows part of an original image. Referring to FIG. 4A, each small square corresponds to a pixel. This part of the original image includes 32 pixels. Each pixel is given a serial number. In the illustrated example, image analyzer 220 selects every other pixel from the image. Thus, referring to FIG. 4B, eight pixels are selected, namely, pixels 1, 3, 5, 7, 17, 19, 21, 23. In this manner, the size of the original image is proportionally reduced.

In step 306, image analyzer 220 averages the pixel values of every predetermined number of selected pixels. For example, the predetermined number may be "4." Accordingly, image analyzer 220 may group every four selected pixels together, and computer an arithmetic average of the pixel values of these four selected pixels. Image analyzer 220 may use the averaged pixel values to generate a reduced image. Referring to FIG. 4C, image analyzer 220 reduces the eight selected pixels to two pixels, by averaging the pixel values of original pixels 1, 3, 17, and 19, and averaging the pixels values of original pixels 5, 7, 21, and 23. Thus, there are two remaining pixels. Each remaining pixel has an averaged pixel value. In this manner, the size of the original image is further reduced. It can be seen from FIGS. 4A-4C that the size of the reduced image is determined by the number of selected pixels, not the size of the original image.

Figure 5A:
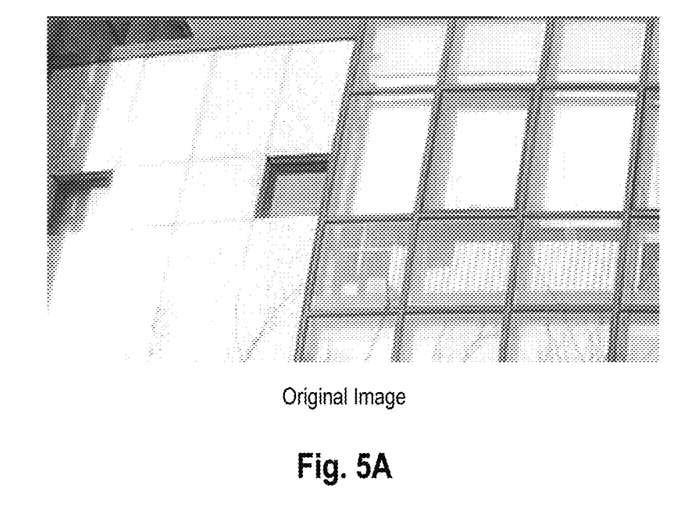
FIGS. 5A-5C are images illustrating an implementation of the method of FIG. 3, according to an exemplary embodiment.
Figure 5B:
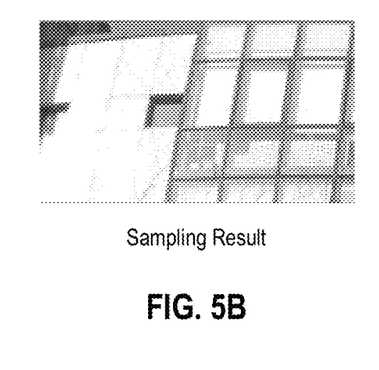
Figure 5C:
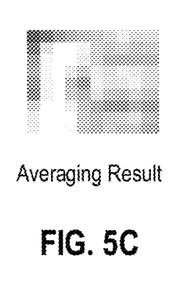

FIGS. 5A-5C are exemplary images illustrating an implementation of method 300. FIG. 5A shows an original image obtained in step 302. FIG. 5B shows a sampling result generated in step 304. Referring to FIG. 5B, the size of the sampling result is proportionally smaller than the original image. But the sampling result largely preserves the texture of the original image. FIG. 5C shows an averaging result, i.e., the reduced image, generated in step 306. Referring to FIG. 5C, the size of the averaging result is further reduced from the original image. The texture of the averaging result is also further simplified from the original image. However, the basic pattern in the original image is still discernible in the averaging result.

Figure 7:
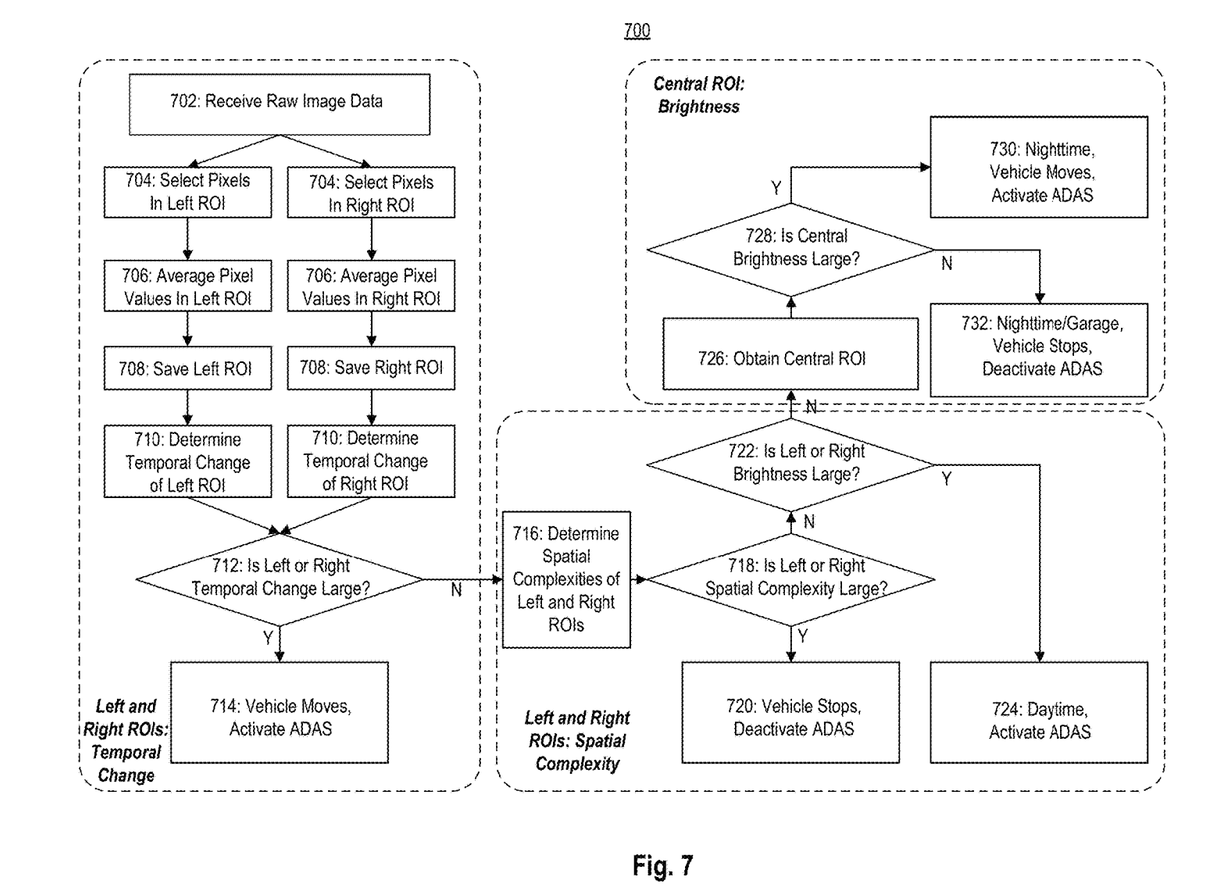
FIG. 7 is a flowchart of a motion determination method, according to an exemplary embodiment.

Method 300 both reduces the number of pixels in the original image by selective sampling and averages the pixel values of the selected pixels. This way, method 300 reduces the size of a ROI, while still preserving the distinct pattern shown in the ROI. As described below, method 300 may be used to extract the features from ROIs before further analysis (method 700) are performed on the ROIs to determine the motion of a movable object. Thus, method 300 can reduce the computing workload, but still provide a reliable result.

Proper activation and deactivation of the ADAS should satisfy the following situations:
1. When vehicle 110 moves during the daytime, the ADAS should be activated.
2. When vehicle 110 stops and there are other vehicles and/or pedestrians passing by vehicle 110, the ADAS should be deactivated.
3. When vehicle 110 stops in a complex environment, e.g., in a city street, the ADAS should be deactivated.
4. When vehicle 110 stops in a simple environment, e.g., parking in a garage, the ADAS should be deactivated.
5. When vehicle 110 moves during nighttime, the ADAS should be activated.

Figure 6:
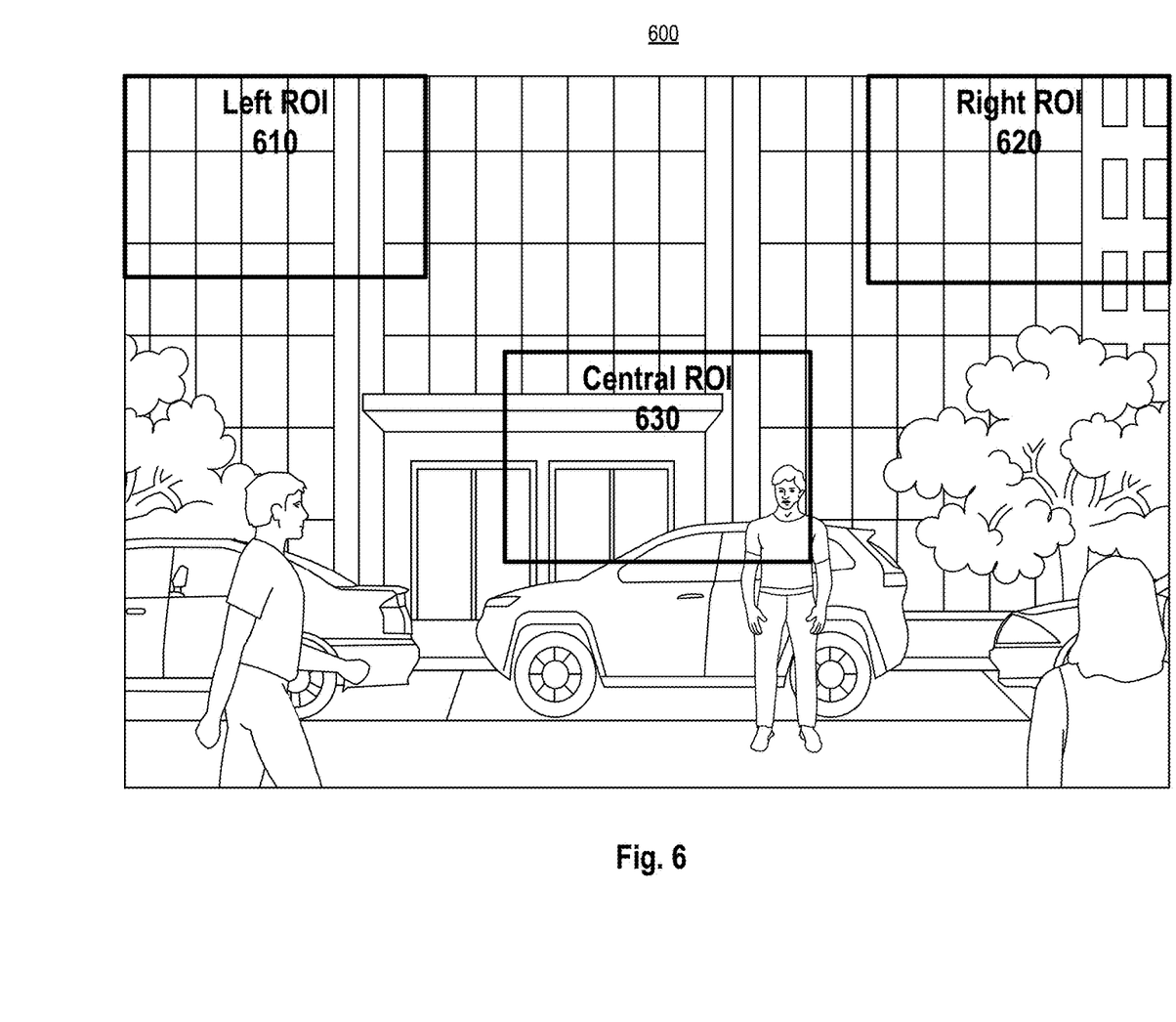
FIG. 6 is a schematic diagram illustrating an image frame with one or more ROIs, according to an exemplary embodiment.

To fully address the above these situations, image analyzer 220 may select three ROIs from the image generated by imaging device 210. FIG. 6 is a schematic diagram illustrating an image frame 600 with multiple ROIs, according to an exemplary embodiment. For example, image frame 600 may be generated by imaging device 210. Referring to FIG. 6, image frame 600 may be an image of an environment surrounding vehicle 110. Image frame 600 may have a left ROI 610, a right ROI 620, and a central ROI 630, respectively located on the upper left corner, upper right corner, and center of image frame 600.

Left ROI 610, right ROI 620, and central ROI 630 have distinct image features related to the motion of vehicle 110. Generally, each of left ROI 610 and right ROI 620 corresponds to a "static portion" of the environment surrounding vehicle 110, while central ROI 630 corresponds to an "active portion" of the environment. Generally, the view in an active portion is more active (i.e., dynamic) than a static portion. However, this does not mean that the view in an active portion is always active, or the view in a static portion is always static. Instead, "active" and "static" as used in the present disclosure are relative terms that are evaluated based on statistical average. In other words, on average the change of an active portion is more significant than the change of a static portion.

For example, left ROI 610 and right ROI 620 are above the ground. The temporal changes, i.e., frame differences, of left ROI 610 and right ROI 620 are generally not correlated to the change of the ground traffic, such as the movement of other vehicles and pedestrians. When vehicle 110 does not move, the temporal changes of the pixel value, i.e., greyscale values, in left ROI 610 and right ROI 620 are generally small. However, when vehicle 110 moves, the temporal changes of the greyscale values in left ROI 610 and right ROI 620 may be large, due to the change of surrounding objects in these ROIs. For example, when vehicle 110 travels in a city, left ROI 610 and right ROI 620 may contain images of the surrounding buildings. The change of the building images in left ROI 610 and right ROI 620 may cause large temporal changes in these ROIs. Therefore, the temporal changes of left ROI 610 and right ROI 620 are good indicators of the motion of vehicle 110.

On the other hand, central ROI 630 is at the ground level and shows part of the ground traffic. Thus, the temporal change of central ROI 630 is highly correlated to the change of the ground traffic. When vehicle 110 moves, the temporal change of the greyscale values in central ROI 630 may be large due to the change of the street condition. When vehicle 110 does not move, the temporal change of the greyscale values in central ROI 630 may be prone to be affected by the ground traffic. For example, when a pedestrian or another vehicle passes by vehicle 110, this may cause a large temporal change in central ROI 630. Therefore, the temporal change of central ROI 630 is not a good indicator of the motion of vehicle 110.

Left ROI 610, right ROI 620, and central ROI 630 also have distinct image features related to the ambient light condition. During the daytime, all the three ROIs may have large greyscale values. The spatial complexities (i.e., texture) of the three ROIs, as measured by the root-mean-square derivation of the greyscale values, may also be large.

On the other hand, during nighttime, particularly if the street lighting is poor, left ROI 610 and right ROI 620 may have small greyscale values and small spatial complexities. However, due to the illumination by the headlights of vehicle 110, central ROI 630 may still have large greyscale values and spatial complexities. In one embodiment, central ROI 630 may be formed in the path of the headlight so as to achieve better illumination.

Moreover, when vehicle 110 stops in a covered space, such as in a parking garage, the headlights may be turned off. In this situation, all the three ROIs may have small greyscale values and spatial complexities.

Although shown as such in exemplary embodiments, it is understood that the locations of the three ROIs are not necessarily in the upper left corner, upper right corner, and the center of image frame 600, respectively. Instead, left ROI 610 and right ROI 620 may be located anywhere above the ground traffic, and central ROI 630 may be located anywhere as long as it includes part of the ground traffic.

Based on the above description, it can be seen that the motion of vehicle 110 may be determined based on the brightness (i.e., greyscale value), the temporal change (i.e., frame difference), and the spatial complexity (i.e., root-mean-square derivation of the greyscale values) of one or more ROIs. FIG. 7 is a flowchart of a motion determination method 700, according to an exemplary embodiment. For example, method 700 may be used in image analyzer 220 to determine the motion of vehicle 110.

Referring to FIG. 7, method 700 may include the following steps.

Steps 702-706 are similar to steps 302-306, respectively. In steps 702-706, image analyzer 220 reduces the image sizes of left ROI 610 and right ROI 620.

In step 708, image analyzer 220 saves the ROI 610 and right ROI 620 in memory 226 for further processing.

In step 710, image analyzer 220 determines the temporal changes of left ROI 610 and right ROI 620. The temporal change may be the frame difference between a current image frame and a previous image frame or an average of previous image frames. For example, to determine the temporal change of left ROI 610, image analyzer 220 may first average the greyscale values of a number (e.g., 5 or 10) of previous left ROIs 610 obtained respectively at different points in time. Image analyzer 220 may then determine the temporal chance of left ROI based on the following equation (1):

$$\text{Temporal Change} = \frac{\sum_{i,j} |P_{current} - P_{previous}|}{\sum_{i,j} P_{previous}} \quad (1)$$

In equation (1), $P_{previous}$ is an averaged greyscale value of the previous left ROI 610, and $P_{current}$ is a greyscale value of the current left ROI 610.

In step 712, image analyzer 220 determines whether the temporal change of left ROI 610 or right ROI 620 exceeds a predetermined temporal change.

In step 714, when at least one of left ROI 610 or right ROI 620 has a temporal change exceeding the predetermined temporal change, image analyzer 220 may determine that vehicle 110 is moving and the ADAS need to be activated.

In step 716, when neither left ROI 610 nor right ROI 620 has a temporal change exceeding the predetermined temporal change, image analyzer 220 may determine the spatial complexities of left ROI 610 and right ROI 620.

A small temporal change of left ROI 610 or right ROI 620 does not necessarily mean that vehicle 110 is stopped or is moving slowly. For example, when vehicle 110 travels on a highway outside the city limits, left ROI 610 and right ROI 620 may only include the images of the sky, and thus may have small temporal changes even if vehicle 110 is moving fast. Therefore, to determine whether vehicle 110 is stopped or is moving, image analyzer 220 must further determine the spatial complexities of left ROI 610 and right ROI 620, based on the following equation (2):

$$\text{Spatial Complexity} = \sqrt{\frac{\sum_{i,j}(P_{i,j} - P_{average})^2}{N}} \quad (2)$$

In equation (2), $P_{average}$ is the average of the greyscale values in left ROI 610 and right ROI 620, and N is the number of pixels in the respective ROI. The spatial complexity is the root-mean-square derivation of the greyscale values in each ROI.

In step 718, image analyzer 220 determines whether the spatial complexity of left ROI 610 or right ROI 620 exceeds a predetermined level of spatial complexity.

In step 720, when at least one of left ROI 610 or right ROI 620 has a spatial complexity exceeding the predetermined spatial complexity level, image analyzer 220 may determine that vehicle 110 is stopped and the ADAS should be deactivated.

When left ROI 610 or right ROI 620 has a large spatial complexity, this indicates that vehicle 110 is in a complex environment, such as an urban area. Thus, a small temporal change in the respective ROI indicates that vehicle 110 is stopped.

In step 722, when neither left ROI 610 nor right ROI 620 has a spatial complexity exceeding the predetermined spatial complexity level, image analyzer 220 may determine whether the brightness of left ROI 610 and right ROI 620 exceeds a first predetermined brightness level.

A small spatial complexity left ROI 610 or right ROI 620 does not necessarily mean that vehicle 110 is in a less complex environment, for example, outside the city limits. For example, when vehicle 110 moves or stops during nighttime, left ROI 610 and right ROI 620 may also have small spatial complexities. Thus, image analyzer 220 needs to further determine the brightness of left ROI 610 and right ROI 620. In one embodiment, the brightness may be defined as the average greyscale vale $P_{average}$ of a ROI.

In step 724, when the brightness of at least one of left ROI 610 or right ROI 620 exceeds the first predetermined brightness level, image analyzer 220 may determine that vehicle 110 is traveling in daytime and the ADAS should be activated.

In this case, vehicle 110 is likely in a less complex environment and in daytime. However, it is not certain whether vehicle is moving or not. To ensure driver safety, image analyzer 220 may nevertheless assume that vehicle 110 is moving and activate the ADAS.

In step 726, when neither left ROI 610 nor right ROI 620 has brightness exceeding the first brightness level, image analyzer 220 obtains central ROI 630, similar to the obtaining of left ROI 610 and right ROI 612 in steps 702-706.

In this case, vehicle 110 is likely in nighttime or in a dark space. Image analyzer 220 needs to further examine central ROI 630 to determine the motion of vehicle 110.

In step 728, image analyzer 220 determines whether the brightness of central ROI 630 exceeds a second brightness level. Similar to step 722, image analyzer 220 may determine the brightness of central ROI 630 by computing the average greyscale value $P_{average}$ of central ROI 630.

In step 730, when the brightness of central ROI 630 exceeds the second brightness level, image analyzer 220 determines that vehicle 110 is moving in nighttime and the ADAS should be activated.

In this case, the high average greyscale value of central ROI 630 indicates that headlights of vehicle 110 are turned on, that vehicle 110 is travelling in nighttime, and it is likely that the driver is driving vehicle 110. Thus, image analyzer 220 may determine that vehicle is moving and the ADAS should be activated.

In step 732, when the brightness of central ROI 630 does not exceed the second brightness level, image analyzer 220 determines that vehicle 110 is stopped in nighttime or in a dark space and the ADAS should be deactivated.

In this case, the low average greyscale value of central ROI 630 indicates that headlights of vehicle 110 are extinguished and that vehicle 110 is in nighttime or in a dark space. Thus, it is likely that vehicle 110 is not moving.

While illustrative embodiments have been described herein, the scope of any and all embodiments have equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed processes may be modified in any manner, including by reordering steps and/or inserting or deleting steps.

For example, consistent with the present disclosure, smart driver assistance device 120 may be tailored according to various practical considerations. In one embodiment, in addition to dashboard camera 122, smart driver assistance device 120 may include any suitable auxiliary equipment for providing additional information regarding the motion of vehicle 110. In another embodiment, smart driver assistance device 120 may only include dashboard camera 122, so as to reduce cost and simplify the installment and setup of smart driver assistance device 120.

For example, smart driver assistance device 120 may optionally include a range detector 124 (FIG. 1) configured to obtain depth information of objects in the environment surrounding vehicle 110. For example, range detector 124 may be embodied by a light detection and ranging (LIDAR) device, a radio detection and ranging (RADAR) device, a sound navigation and ranging (SONAR) device, or any other device known in the art. In one example, range detector 124 may include an emitter (e.g., a laser) that emits a detection beam (e.g., a laser beam), and an associated receiver that receives a reflection of that detection beam. Based on characteristics of the reflected beam, a distance and a direction from an actual sensing location of range detector 124 on vehicle 110 to a portion of a sensed physical object (e.g., another vehicle) may be determined. In this manner, range detector 124 may be used to detect the distance from vehicle 110 to other objects, vehicles, and pedestrians.

The depth information obtained by range detector may be used by smart driver assistance device 120 to decide whether to activate or deactivate the ADAS. For example, if range detector 124 detects that the distance between vehicle 110 and an object has been kept below a predetermined distance (e.g., 0.5 meter) for longer than a predetermined time period (e.g., 10 minutes), driver assistance device 120 may determine that vehicle 110 is parked in a garage or caught in a traffic jam, and therefore may deactivate the ADAS.

It is intended, therefore, that the specification and examples be considered as illustrative only, with a true scope and spirit being indicated by the following claims and their full scope of equivalents.

What is claimed is:

1. A method performed by a processor in communication with an imaging device mounted on a movable object, the method comprising:
   in a view of an environment outside the movable object, identifying a first region of interest (ROI) corresponding to a static portion of the environment, the first ROI covering at least an area in which vehicle and pedestrian traffic cannot be observed;
   in the view of the environment, identifying a second region of interest (ROI) corresponding to an active portion of the environment, the second ROI covering at least an area in which vehicle or pedestrian traffic can be observed;
   receiving, from the imaging device, first and second image data respectively representing the first and second ROIs;
   analyzing the first image data over time, wherein analyzing the first image data comprises performing a first comparison of an image property of the first ROI with a first threshold;
   analyzing the second image data over time, wherein analyzing the second image data comprises performing a second comparison of an image property of the second ROI with a second threshold; and
   determining whether the movable object is in motion based on the analyses of the first and second image data.

2. The method of claim 1, wherein the determining comprises concluding that the movable object is not in motion if a change over time of the first image data is less than a change over time of the second image data.

3. The method of claim 1, wherein the movable object is a vehicle.

4. The method of claim 1, wherein the first ROI corresponds to a first static portion of the environment, the method further comprising:
   in the view of the environment, identifying a third ROI corresponding to a second static portion of the environment, second static portion being non-overlapping with the first static portion;
   receiving third image data representing the third ROI;
   analyzing the third image data over time;
   comparing the analyses of the first and third image data; and
   determining whether the movable object is in motion at least partially based on the comparison result.

5. The method of claim 1, wherein:
   determining whether the movable object is in motion comprises determining whether the movable object is in motion based on at least one of the first or second comparisons.

6. The method of claim 5, wherein the image property of a ROI comprises at least one of a change of pixel values over time, a complexity of pixel values in space, or a brightness in the ROI.

7. The method of claim 6, wherein the change of pixel values over time is calculated as a change over time of an averaged pixel value.

8. The method of claim 6, wherein the complexity of pixel values is calculated as a root-mean-square derivation of pixel values.

9. The method of claim 6, wherein the brightness in the ROI is calculated as an averaged pixel brightness value.

10. The method of claim 1, wherein receiving the first and second image data comprises:
    receiving raw data corresponding to the first and second ROIs; and
    down-sampling the raw data to generate the first and second image data.

11. The method of claim 10, wherein:
    the raw data corresponding to the first and second ROIs includes a plurality of pixel values; and
    down-sampling the raw data comprises:
    sampling, according to a sampling rule, a subset of pixel values from the raw data corresponding to the first and second ROIs;
    dividing the sampled pixel values into a predetermined number of groups; and
    averaging the pixel values in the groups.

12. The method of claim 6, further comprising:
    determining whether a change of pixel values over time in the first ROI exceeds a first amount of change; and
    when the change of pixel values over time in the first ROI exceeds the first amount of change, concluding that the movable object is in motion.

13. The method of claim 12, further comprising:
    when the change of pixel values over time in the first ROI does not exceed the first amount of change, determining whether a complexity of pixel values in the first ROI exceeds a first complexity level; and
    when the complexity of pixel values in the first ROI exceeds the first complexity level, concluding that the movable object is not in motion.

14. The method of claim 13, further comprising:
    when the complexity of pixel values in the first ROI does not exceed the first complexity level, determining whether a brightness in the first ROI exceeds a first brightness level;
    when the brightness in the first ROI does not exceed the first brightness level, determining whether a brightness in the second ROI exceeds a second brightness level; and
    when the brightness of the second ROI exceeds the second brightness level, determining that the movable object is in motion.

15. The method of claim 14, further comprising:
    when the brightness in the second ROI exceeds the second brightness level, concluding that the current time is nighttime.

16. The method of claim 14, further comprising:
    when the brightness in the second ROI does not exceed the second brightness level, concluding that the movable object is not in motion.

17. The method of claim 14, further comprising:
    when the brightness in the second ROI does not exceed the second brightness level, concluding that the movable object is in at least one of nighttime or a covered space.

18. The method of claim 14, further comprising:
    when the brightness in the first ROI exceeds the first brightness level, concluding that the movable object is in motion.

19. The method of claim 14, further comprising:
    when the brightness in the first ROI exceeds the first brightness level, concluding that the movable object is in daytime.

20. The method of claim 1, further comprising:
    determining a distance between the movable object and a second object outside the movable object;
    analyzing the distance over time; and
    determining a current state of the movable object based on the analysis of the distance.

21. The method of claim 20, further comprising:
when the distance stays below a first threshold distance for longer than a first time duration, concluding that the movable object is not in motion.

22. A device, comprising:
a memory storing instructions; and
a processor in communication with an imaging device mounted on a movable object, the processor configured to execute the instructions to:
- in a view of an environment outside the movable object, identify a first region of interest (ROI) corresponding to a static portion of the environment, the first ROI covering at least an area in which vehicle and pedestrian traffic cannot be observed;
- in the view of the environment, identify a second region of interest (ROI) corresponding to an active portion of the environment, the second ROI covering at least an area in which vehicle or pedestrian traffic can be observed;
- receive, from the imaging device, first and second image data respectively representing the first and second ROIs;
- analyze the first image data over time, wherein analyzing the first image data comprises performing a first comparison of an image property of the first ROI with a first threshold;
- analyze the second image data over time, wherein analyzing the second image data comprises performing a second comparison of an image property of the second ROI with a second threshold; and
- determine whether the movable object is in motion based on the analyses of the first and second image data.

23. A non-transitory computer-readable storage medium storing instructions that, when executed by a processor in communication with an imaging device mounted on a movable object, cause the processor to perform operations comprising:
- in a view of an environment outside the movable object, identifying a first region of interest (ROI) corresponding to a static portion of the environment, the first ROI covering at least an area in which vehicle and pedestrian traffic cannot be observed;
- in the view of the environment, identifying a second region of interest (ROI) corresponding to an active portion of the environment, the second ROI covering at least an area in which vehicle or pedestrian traffic can be observed;
- receiving, from the imaging device, first and second image data respectively representing the first and second ROIs;
- analyzing the first image data over time, wherein analyzing the first image data comprises performing a first comparison of an image property of the first ROI with a first threshold;
- analyzing the second image data over time, wherein analyzing the second image data comprises performing a second comparison of an image property of the second ROI with a second threshold; and
- determining whether the movable object is in motion based on the analyses of the first and second image data.

* * * * *